April 17, 1956     E. E. JOHNSON, JR     2,741,949
COMBINED MIRROR AND THERMOMETER
Filed April 13, 1953
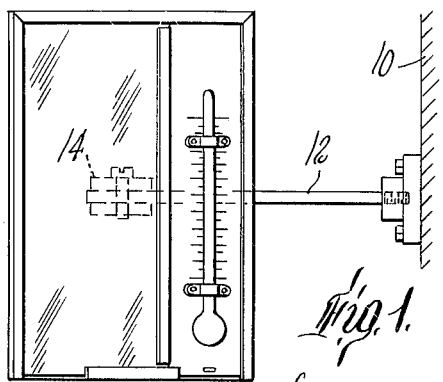
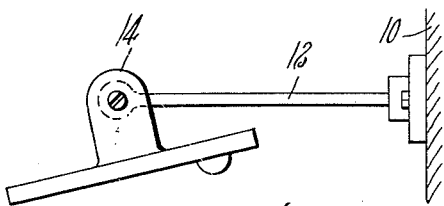
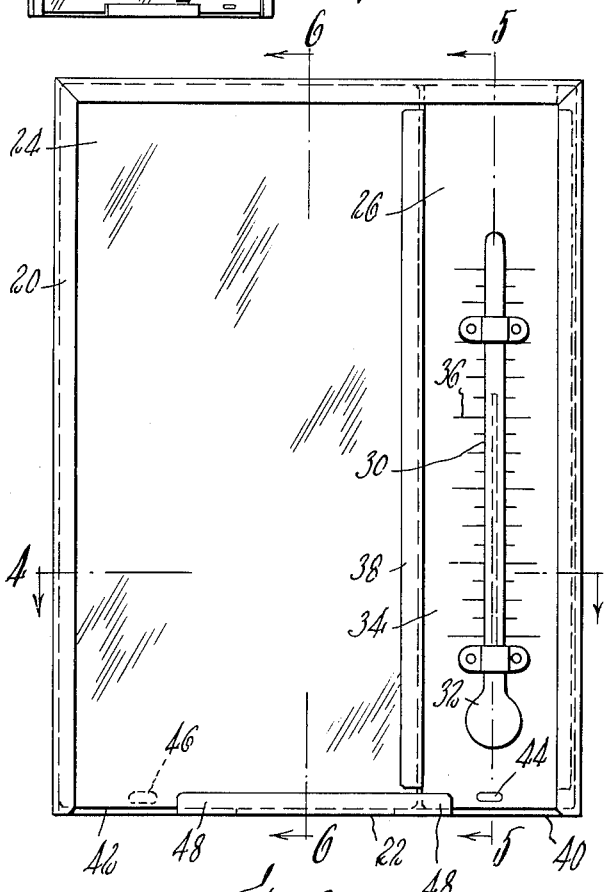
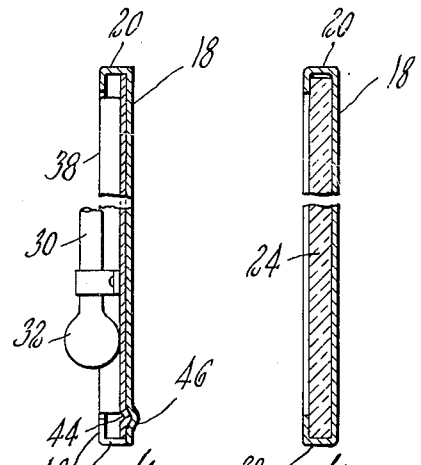
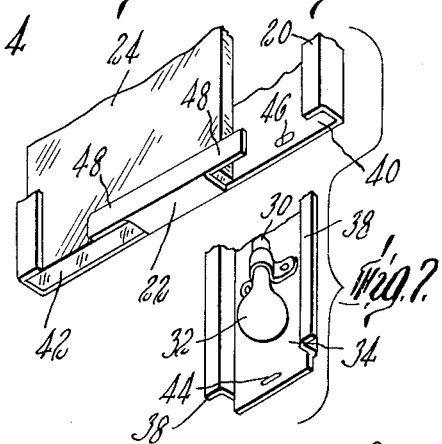
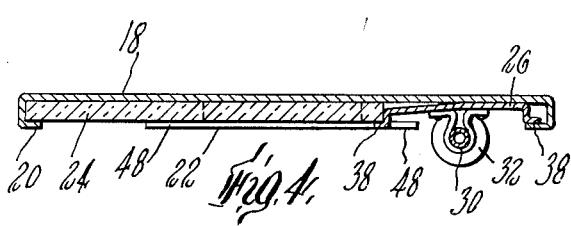
Inventor
Elmer E. Johnson, Jr.
by Wright, Brown,
Quinby & May
Attys.

United States Patent Office 2,741,949
Patented Apr. 17, 1956

2,741,949

COMBINED MIRROR AND THERMOMETER

Elmer E. Johnson, Jr., Wellesley, Mass.

Application April 13, 1953, Serial No. 348,340

2 Claims. (Cl. 88—96)

This invention relates to a device adapted to be mounted on the front wall of a dwelling near one of the windows on the first floor. It is an object of the invention to provide a mirror supported by a bracket in such a position as to command a view of the front door of the house so that an occupant of the house can by looking at the mirror through a window observe anyone who may be at the front door. To add to the utility of the device, a thermometer is mounted alongside of the mirror for convenient inspection. It is desirable that the mirror have the outer position, that is, that it be more remote from the house than the thermometer. Since it is also desirable that the device be capable of being mounted either to the right or to the left of the front door, the device is made, according to the invention, so that the thermometer can be located on either side of the mirror, as hereinafter described.

For a more complete understanding of the invention, reference may be had to the following description thereof, and to the drawing, of which—

Figure 1 is an elevational view of a device embodying the invention;

Figure 2 is a plan view of the same;

Figure 3 is an elevation, on a larger scale, of the device shown in Figure 1, but without the supporting bracket;

Figure 4 is a section on the line 4—4 of Figure 3;

Figure 5 is a section on the line 5—5 of Figure 3;

Figure 6 is a section on the line 6—6 of Figure 3; and

Figure 7 is an exploded perspective view of the lower portion of the device shown in Figure 3.

The device is intended to be mounted on a house wall 10 by means of a bracket 12 to which the device is adjustably secured by a pivot joint 14. The device comprises a back plate 18 of sheet metal having an inturned rim 20 which extends along the top and side edges and the mid portion of the bottom edge as at 22.

A mirror 24 and a thermometer 26 are mounted side by side against the back plate, the top margin and a side margin of the mirror being overlapped by the rim 20.

The thermometer 26 consists of a tube 30 and bulb 32 mounted on a rectangular back 34 of thin metal carrying the usual scale marks 36. The back 34 has its side margins 38 offset forward to make the effective thickness of these margins substantially equal to the thickness of the mirror 24. In the assembled device, one of the offset margins 38 fits within the inturned rim 20 of the back plate 18. The other offset margin 38 of the thermometer overlaps a side margin of the mirror 24.

The thermometer 26 is shown in Figure 3 to the right of the mirror. If the device is to be mounted at the other side of the front door of the house, it will be desirable to mount the thermometer to the left of the mirror. For this purpose a gap 40 is left at the bottom edge of the back plate between the bottom rim portion 22 and a lower corner of the back plate, this gap being as long as the total width of the thermometer so that the thermometer can be withdrawn downward through the gap from the position it occupies as shown in Figure 3. A similar gap 42 is provided in the bottom rim between the portion 22 and the other lower corner of the back plate. When the thermometer has been withdrawn through the gap 40, the mirror 24 is shifted to the right until its right-hand side margin is overlapped by the adjacent rim 20. Then the thermometer 26 is pushed up beside the mirror. To hold the thermometer releasably in place so it will not fall out through the gap beneath it, the back 34 may be dented as at 44 to form a rearwardly projecting boss. This boss enters a corresponding recess 46 in the back plate 18, one such recess being provided above each of the gaps 40 and 42. The rim portion 22 which extends along the mid portion of the bottom edge of the back plate has front wings or extensions 48 which bear against the mirror and thermometer back and help to keep these members in place.

I claim:

1. A device of the class described comprising a rectangular back plate with an inturned rim along its top and side edges and along a mid portion of its bottom edge, a mirror mounted against said plate with marginal portions fitted under said rim, a rectangular sheet metal member with forwardly offset side margins mounted against said plate beside said mirror, one of the offset side margins of said member overlapping the adjacent margin of the mirror, the other offset margin of said member being overlapped by the adjacent portion of said rim, and means releasably holding said member in position.

2. A device as in claim 1, the rim at the bottom edge of the back plate having a gap extending in from each lower corner of the back plate a distance equal to the width of the sheet metal member back, whereby said member may be inserted from below on either side of the mirror.

References Cited in the file of this patent

UNITED STATES PATENTS

| | | |
|---|---|---|
| 389,802 | Gilbert | Sept. 18, 1888 |
| 1,496,481 | Melius | June 3, 1924 |
| 1,508,465 | McGhan | Sept. 16, 1924 |
| 1,521,621 | Hammond | Jan. 6, 1925 |
| 1,689,471 | Andrusis | Oct. 30, 1928 |
| 1,860,986 | Boyce | May 31, 1932 |
| 1,909,362 | Keith | May 16, 1933 |
| 2,016,763 | Alexander | Oct. 8, 1935 |